United States Patent [19]

Gates et al.

[11] Patent Number: 4,502,351
[45] Date of Patent: Mar. 5, 1985

[54] THIRD ACCUMULATOR CHECK VALVE

[76] Inventors: Guy W. Gates, 2627 Lofty View Dr., Torrance, Calif. 90505; James F. Bates, Rte. 3, Box 240, Cherokee, Ala. 35616; John F. Larsen, 1414 W. 11400 South, South Jordan, Utah 84065; Benjamin F. Law, 103 S. Atlanta Ave., Sheffield, Ala. 35660

[21] Appl. No.: 520,119

[22] Filed: Aug. 8, 1983

[51] Int. Cl.³ .............................................. F16K 11/10
[52] U.S. Cl. ...................................... 74/753; 137/102
[58] Field of Search .................. 74/753, 869; 137/102, 137/107; 192/109 F

[56] References Cited

U.S. PATENT DOCUMENTS

| | | | |
|---|---|---|---|
| 2,928,417 | 3/1960 | Buchner et al. | 137/538 |
| 3,027,913 | 4/1962 | Chatham et al. | 137/484.2 |
| 3,344,681 | 10/1967 | Searles | 74/472 |
| 3,464,321 | 9/1969 | Piotrowski | 137/102 X |
| 3,682,043 | 8/1972 | Bailey et al. | 91/412 |
| 3,757,644 | 9/1973 | Bailey et al. | 91/411 R |
| 3,789,963 | 2/1974 | Bailey et al. | 192/3.57 |
| 4,031,915 | 6/1977 | McElhoe et al. | 137/529 |
| 4,041,970 | 8/1977 | Peters | 137/102 |

FOREIGN PATENT DOCUMENTS 535369  4/1941  United Kingdom .............. 137/107

Primary Examiner—Robert G. Nilson
Attorney, Agent, or Firm—T. Eugene Burts

[57] ABSTRACT

An improved third accumulator check valve is provided for the valve chamber which services feed oil to the release side of the intermediate servo cylinder of a turbohydramatic transmission system for motor vehicles wherein the intermediate band is released as direct clutches are applied. It comprises a positive seating valve in the chamber exhaust port, preventing exhaust port leakage which results in premature band application and clutch drag, and is characterized by a valve body which has more favorably disposed outer lift surfaces and an internal bore flow chamber with additional lift surfaces, said bore being provided further with a flow-released bore closure biasing the valve responsive to active flow pressure with assisted force into a continuously seated position.

10 Claims, 9 Drawing Figures

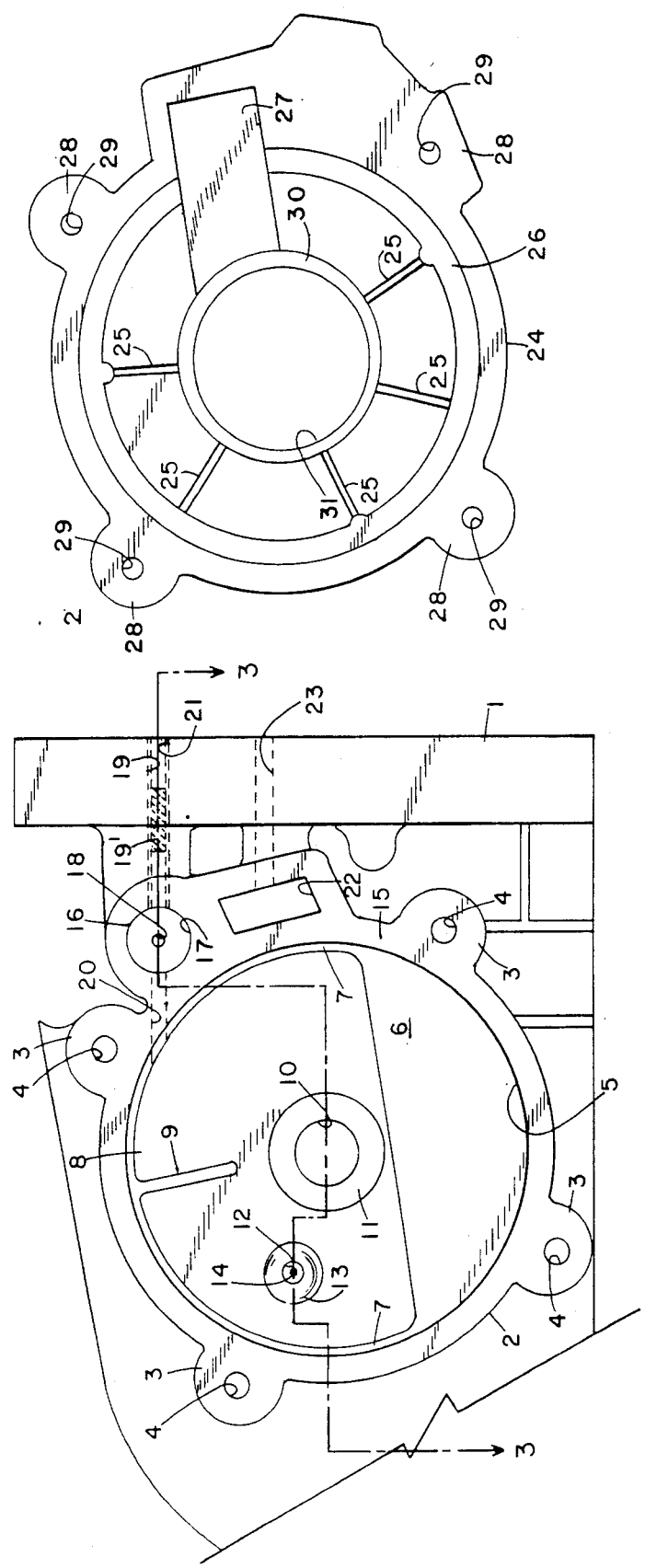

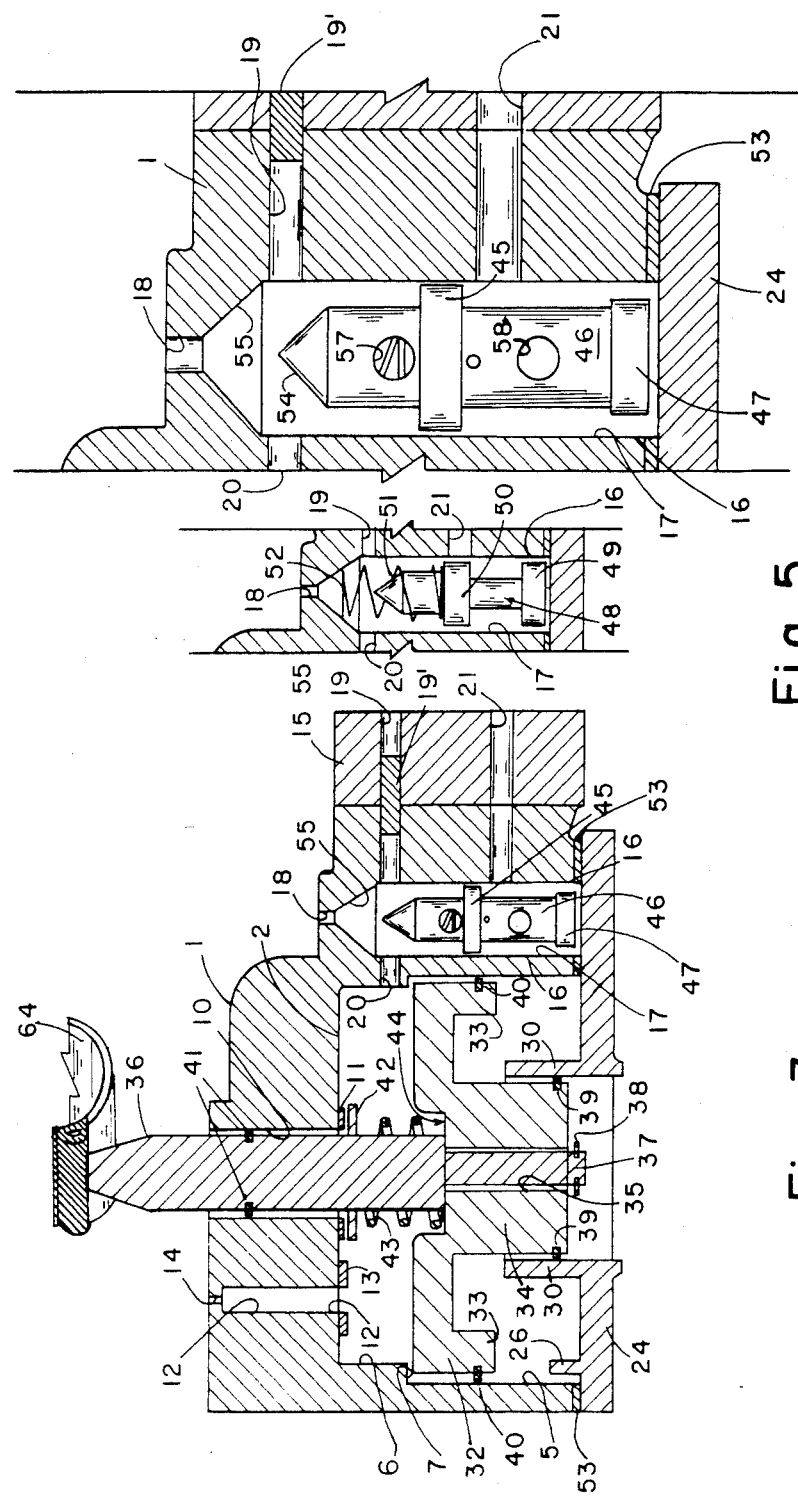

THIRD ACCUMULATOR CHECK VALVE

ORIGIN OF THE INVENTION

The invention described herein was made by private individuals as the result of individual experimental work; and is directed toward a new and useful improvement in a third accumulator check valve.

BACKGROUND OF THE INVENTION

1. Field of the Invention

This invention relates in general to check valves for use in turbohydramatic transmission systems for automobiles and it deals more particularly with an improved type of third accumulator check valve used in such a system.

The invention is directed toward a third accumulator check valve so designed as to assure positive seating in operation, thus preventing damaging leakage which can result in unusual wear on an automobile transmission system.

With the advent of the modern automobile there came into being the need for and the immediate use of an automatic transmission system, whereby an automobile could be automatically shifted up into the series of gear ratios necessary to obtain the desired speed and shifted downwardly into the necessary gear ratios to decrease or stop that speed.

The oil operated hydramatic transmission was chosen as a very efficient means of achieving the foregoing ends and power is transmitted through oil to the gear drive train, providing additional torque multiplication when required by means of the sequential application of a series of gears to achieve the proper gear ratio and desired speed.

The drive train of an automobile comprises a series of intermeshing drive gears which must be continously engaged and disengaged automatically.

It has been found that the most desirable type of gears to be used are those which remain constantly intermeshed to avoid the clashing of gears which might be present if various gear combinations were suddenly engaged at different speeds.

It has been found that the most desirable medium for preventing the clashing of gears is to use a planetary gear set. The planetary gear set comprises a system of gears contained within an outer gear housing which has the contradictory name of "internal gear" because the teeth of this outer housing are contained on the periphery of the inside of the gear housing. Engaging the internal teeth of the internal gear are a series of pinion gears secured to a carrier. These pinion gears ride enmeshed with the gear teeth of the central gear located within the housing known as the "sun gear".

Through the rotation of various combinations of the foregoing described gears different gear ratios and speeds may be obtained with this type of system without the necessity of disengaging any gear teeth in the operation.

In the turbohydramatic drive, such as used in most General Motors automobiles, various combinations of planetary gear sets are employed, but an important feature of the operation of this system resides in the means of causing these gear sets to be engaged in the various combinations.

In the type of transmission with which we are dealing a torque converter smoothly couples through oil the engine power to the gear train and hydraulically provides additional torque multiplication when required. The engaging of the gears is entirely automatic and depends upon the automatic actuation of clutches to engage the gears.

A direct clutch is employed during one phase of the operation to engage a combination of the planetary gears. This clutch housing is engaged through an input drum to engage different combinations of gears during different modes of the clutch.

In one mode of the system, with which we are dealing in this patent application, an intermediate band is tightened against the outside of the direct clutch housing, preventing rotation of the same, and preventing the sun gear and input drum from rotating.

The intermediate band is released as the direct clutch is applied for third gear in order to allow the direct clutch to drive the sun gear.

In summary, it is necessary that there be a smooth and efficient operation of this system which is used to apply the third gear clutches and release the band that holds the transmission in second gear.

The intermediate band is applied and released by means of the use of an intermediate servo cylinder and piston system. This cylinder and piston is often referred to as the "intermediate servo".

In this servo system the outer end of the servo piston shaft is in communication with the intermediate band, and operates such that when the piston is in the mode with its shaft at maximum extension from the housing the shaft actuates the intermediate band to tighten this band on the clutch housing. When the servo piston shaft is withdrawn into its extreme position within the cylinder housing it loosens the intermediate band and applies the direct clutch by means of oil which is routed thereto to shift the drive train and transmission into a higher gear.

The intermediate servo is oil operated at all times through a remote system of shift valves, which valve the required oil into the proper path by reacting to the operation of a special governor for this system.

When direct clutch oil is routed to apply the direct clutch it also passes through an oil line connected through an accumulator check valve chamber to the release, or upper, side of the intermediate servo piston to release the band. In order to have a positive flow and smooth operation of the oil passing to the release side of the intermediate servo piston through the accumulator check valve chamber, the check valve must seat quickly, firmly and positively to prevent a hesitant operation of the system. This accumulator check valve is oftentimes referred to as the "third accumulator check valve" because it is used to shift from second to third gear in the operation of the vehicle.

As previously noted, oil passes through the accumulator check valve chamber into the servo cylinder against the upper or release side of the servo piston.

A commonly used type of accumulator check valve at the present time is a floating, partially gravity actuated, cylindrical valve. The valve has a conical configuration of its upper end adapted to seat in an exhaust orifice when the valve is actuated to allow a constant flow of oil at constant pressure around the check valve into the servo cylinder. The present valve has an annular shoulder disposed opposite an inlet port for the valve chamber, through which incoming oil operates against the lower side of the shoulder to lift the valve and hold the same in the seated position. It will be remembered that it is important for the exhaust orifice to be completely sealed in order to provide constant pressure on the top side of the servo piston.

In the past the presently provided floating check valves of this design have not achieved the desired results. The means of positive seating depends upon the pressure of oil against the lower surface of the shoulder and bottom of the valve to maintain the same in the seated position. Because of its design it seats much too slowly (or not at all) to stop the exhaust of fluid pressure that is used to apply the third gear clutches and release the intermediate band that holds the transmission in second gear. This slow seating causes a slow or hesitant shift, creating excessive wear on the band and high clutches.

At low speeds in high gear the flow of fluid past the shoulder of the valve is not adequate to keep the valve seated, causing the valve to exhaust fluid pressure through the exhaust orifice and allow the band to partially apply (or drag) due to the release of pressure on the top side of the servo piston, and allow the high clutches to slip. This drag and slip causes premature band and clutch failure. It also generates excessive heat that burns the transmission fluid and friction material.

The floating check valve system is very desirable due to the fact that there are not a number of combined moving parts to this type of valve which can cause friction or wear out over the operation of a transmission system. The floating valve has advantages over the lever system or spring type operated plug valves because there are fewer parts to wear and become inoperative and because the design is simple and economical to manufacture.

The most widely used of the presently designed floating check valves in this application is the cylindrical valve before mentioned, having a conical top which seats in the exhaust orifice and provided midway of its length with a projecting annular shoulder and a projecting annular base located at its lower end. This is a solid cylindrical shape object without any inner bore. The reason these valve designs do not work properly and seat efficiently lies in the fact that the outside diameter of the shoulder of the floating valve piece is approximately 0.450 inches in diameter with the piece running in a 0.5000 inches bore. This valve depends upon the flow of fluid around the valve to lift it into the seated position and to hold it there. The axial length of the valve is such that when the valve is released it falls down the bore until the shoulder is even with the input oil feed hole and not above it as should be the case. This makes it very difficult for the flow of the oil to pick up the valve around the shoulder and lift it into the seated position, thereby causing delay in seating.

Therefore, it is very desirable that a different shape be designed for the floating valve body and that the location of any shoulder on the body be such that the body of the valve may be easily lifted by means of the pressure of the oil flow into the seated position. It is also desirable that some auxiliary means be found to allow more free flow of fluid to apply to a greater surface of the valve body in some manner to lift the valve quickly into the seated position and assist in holding it there.

2. Consideration of Prior Art

After competent search, no existing devices of the type disclosed in the present invention were found, there being seven references which were considered, but which do not appear to conflict with the present invention or anticipate the apparatus or the objects and purposes for which it was designed.

The prior art discloses the following U.S. Pat. Nos.:

| W. G. Buchner, et al | Check Valve | 2,928,417 |
| G. N. Chatham, et al | Check Valve | 3,027,913 |
| J. J. Searles | Control Valve | 3,344,681 |
| K. A. Bailey Jerry R. Marlowe | Flow Control Systems | 3,682,043 |
| K. A. Bailey Jerry R. Marlowe | Flow Control System | 3,757,644 |
| K. A. Bailey Jerry R. Marlowe | Transmission Control | 3,789,963 |
| Bruce A. McElhoe G. Tabrah | Irrigation System | 4,031,915 |

The patent to Buchner discloses a check valve reciprocating within a counterbore 32. This structure is not the same as that in the present invention and the orifice is part of a larger bore with the valve seated in a reverse position in this bore to occlude the passage of fluid through a hollow chamber within the valve. Fluid pressure to the right unseats the valve and allows fluid to pass through the hollow chamber in the valve and out the port. The entire valve body itself moves to expose the radial ports 56. This is not the same principle as the present invention.

The patent to Chatham shows a plug 61 within a bore 69 spring biased by means of the spring 72 into a seated position in the bore of the inlet port 68. An outlet port 70 is provided and the plug 61 must be moved a considerable distance from the seat of the port 68 in order for fluid to bypass and exit through the port 70. The bore 63 on the inside of the plug 61 is provided in conjunction with the groove 64 to allow fluid from the backside of the valve to escape through the port 66 into the groove 64 and out through the outlet port 70. FIGS. 2 and 3 are simply modifications of this structure and the structure does not in any way resemble the structure of the present invention nor does it operate in the same manner.

The patent to Searles shows a control valve system for an automatic power transmission. However, the servo systems are spring piston operated by fluid but do not show an accumulator valve similar to the one in the present invention. This invention deals primarily with the entire system and is not directed to a special type of accumulator check valve as we have in the present invention. It does not disclose a valve of similar nature.

The Bailey et al U.S. Pat. No. 3,682,043 shows a slow control system for an automatic transmission. However this is directed to a system as a whole for the pumping and flowage of oil in the transmission system but does not deal with an accumulator check valve of the type shown in the present invention.

The Bailey et al U.S. Pat. No. 3,757,644 shows a flow controlled control system for motors which again deals with an overall system and is not directed to a check valve for a third accumulator as is the present invention. This does not deal with the same type of principle involved or suggest the same.

The Bailey et al U.S. Pat. No. 3,789,963 shows another transmission control system directed to the overall pumping and valving system for an entire transmission which does not direct its attention to a check valve for the third accumulator valve in a transmission such as we have done in the present invention. There is no similarity or suggestion of the present invention by this patent.

The patent to McElhoe, et al, is directed to an irrigation system flushing valve. This patent is directed to an entirely different type of system and does not involve a check ball or an accumulator valve. The valve body in this system is hollow and the valve itself requires a withdrawal to a position such as shown in FIG. 5 in order for there to be an unrestricted flow against the valve through the outlet ports 52 and 53. This patent does not embody the same principle as the accumulator check valve in the present invention and does not disclose nor suggest the present invention.

SUMMARY AND OBJECTS OF THE INVENTION

This invention deals with an improved third accumulator check valve in a turbohydramatic transmission of a type in use employing a floating cylindrical check valve in the accumulator valve chamber.

It is a primary object to provide, in an automatic transmission controlled system wherein clutch bands in the drive train are actuated in gripping connection by a hydraulic servo piston requiring continous pressure on the release side to positively release the gripping action, a means for providing such continous pressure by insuring a continous positive seal of the fluid exhaust port on the release side of said piston.

A further object in connection therewith is to provide in the accumulator check valve for the exhaust port on the release side of a servo piston actuating grip of an intermediate band in a transmission system, a floating check valve adapted to positively seat in said exhaust port and maintain a positive seal thereof until the fluid pressure is intended to be released. A salient feature in connection therewith is the provision of a floating check valve having greater lift surface areas with a biasing means activated by fluid flow to assist in seating the valve and maintaining this mode.

BRIEF DESCRIPTION OF THE DRAWINGS

FIG. 1 is a plan view from the under or bottom side of an open servo cylinder and check valve assembly with the piston removed to show the shaft bore, bleed orifice, check valve chamber and lower oil inlet.

FIG. 2 is a plan view of the inside surface of the under or bottom side cap for the servo cylinder and check valve assembly of FIG. 1, turned over to show the connecting oil inlet passage to the bottom of the cylinder.

FIG. 3 is a modified section view of the cylinder and valve assembly of FIG. 1, taken along lines 3—3 of FIG. 1, with the same section view of an in-place piston in the raised band applying mode with the improved check valve of the applicant in the lowered open position.

FIG. 4 is an enlarged partial section of the check valve chamber of FIG. 3, to show greater detail of the check valve of the applicants.

FIG. 5 is a partial section enlarged of the check valve chamber of FIGS. 3 and 4, showing in place a type of check valve different from that of the applicants' invention presently in use in such check valve chamber.

DETAILED DESCRIPTION OF THE INVENTION

Figure 7:
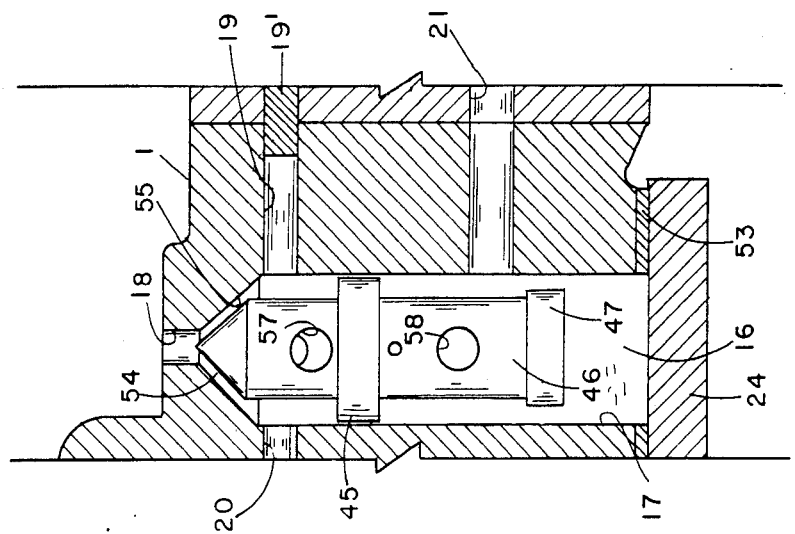
FIG. 7 is an enlarged partial section view of the check valve chamber of FIG. 6, to show greater detail of the applicants' valve in the almost seated position.

Referring more particularly to the drawings, FIG. 1 discloses a portion of a casting 1 cut from the underside of a transmission case to reveal the intermediate servo cylinder 2, in a plan view, looking down into the cylinder with the cylinder head removed. The servo cylinder is provided with four cast ears 3 provided with threaded tap holes 4 adapted to receive bolts to hold in place the cylinder head cover.

The servo cylinder is provided with a relatively large inside bore 5 having a step-down intermediate surface 6 merging into an annular shoulder 7. The further depressed area of the bore 8 has a cast pier 9 which helps strengthen the piston bore at this point and receive the head of the piston as it is retracted in contact with the intermediate surface 6 and annular shoulder 7.

The cylinder 2 is in an inverted position as viewed and in the bottom of the cylinder bore 5 can be seen a centrally disposed bore 10 for the piston shaft. The piston shaft bore 10 is surrounded by an annular shoulder 11.

Displaced from the side of the piston shaft bore 10 and located in what would be the top of the cylinder when it is properly inverted is a bleed orifice bore 12 containing in the distal end thereof a bleed orifice 14 with such bore being surrounded by a raised annular shoulder 13.

The servo cylinder is shown in the inverted position in FIG. 1 in order that it may be seen that there is formed in the cast wall 15 of the cylinder an annular walled valve chamber 16 provided with an extended lengthwise bore 17 having its distal end an exhaust port 18 as shown. Drilled through a plugged wall bore 19 an oil inlet bore 20 is provided from the top of the valve chamber 16 to the cylinder bore 5. (This can best be seen in FIG. 3) The plug is shown as 19'.

Through the wall of the casting 1 is provided an oil inlet bore 21 to serve as a means of admission of oil into the chamber 16, as best seen in FIG. 3.

Also formed in the cast wall 15 of the cylinder and extending deeply into said wall is a rectangular shaped oil passage 22 whose outer opening is even with the bottom surface of the cylinder wall 15. Through the wall of the casting 1 is also provided an oil inlet bore 23 communicating with the oil passage 22.

Referring now to FIG. 2, there is shown a cylinder head or cap 24 as it would appear as viewed from the inside of the servo cylinder 2. If the cylinder of FIG. 1 were turned over and placed on top of the cylinder head 24 of FIG. 2 they would be in the proper juxtaposition. The same would be true if the head of FIG. 2 were turned over and placed on the cylinder of FIG. 1. The cylinder head 24 is provided with a raised annular sealing rim 26 which, when the cylinder head 24 was in position, would fit inside of the bore chamber 5. The rim 26 is interrupted by an in-cast depressed rectangular shaped oil inlet passage 27. The cylinder head is provided with four ears 28 having tap holes 29 through which nuts may be used to hold the cylinder head in position on the cylinder in normal use. The upper surface of the ears 28, including that surface surrounding the passage 27 is so disposed that when the cylinder head 24 is turned over and placed in position on the bottom of the cylinder 2 in FIG. 1, it will be seen that the oil passage 27 corresponds exactly with the passage 22 in order to allow oil to enter through 22 and flow through passage 27 into the bottom of the servo cylinder 2.

A raised annular cylinder head sleeve 30 having a bore 31 is disposed in the center of the cylinder head 24. The passage 27 terminates at the inner wall of the sleeve 30. Reinforcing the sleeve and the head are a series of raised ribs 25 around the radius of the cylinder head 24 and sleeve 30 as shown.

Referring more particularly to FIG. 3, it will be noted that this is a modified section view of the servo cylinder of FIG. 1, taken along divers lines of FIG. 1 in order to show a composite structure without some of its important features obscured. In order that we may see the relationship of the operation of the piston in the servo cylinder in conjunction with the check valve in the check valve chamber the section has been taken in such manner, through the cylinder, with a sectioned piston shown in place.

The piston would normally be symmetrical in its structure, and would thus appear in a section view. However, due to the necessity of showing some detail of the walls of the valve chamber, in conjunction with the operation of the piston, the piston in this section view would appear to have a greater thickness of its rim on one side than appears on the other side. Also, certain portions of the piston do not appear to be of the same length or radius. Actually, the piston is symmetrical in its structure and has the same thickness of rim around its periphery, but it is felt that the showing of the piston in the relationship in this modified section will make the operation of the apparatus clearer.

Referring to FIG. 3, it will be seen that we have a piston 32 positioned within the bore 5 of the cylinder 2.

The piston 32 is provided with a downwardly projecting rim 33 which accomodates a surrounding piston ring 40 used to seal the upper area of the cylinder and piston surface from the lower area.

The piston is also provided with a head extension 34 which fits into the raised cylinder head sleeve 30, as shown, with a surrounding seal ring 39 to prevent the escape of fluid from the lower side of the piston.

The piston shaft 36 is positioned within the piston shaft bore 10, as indicated, with a surrounding piston seal ring 40 to seal the fluid in the cylinder such that it does not escape around the shaft. The piston shaft 36 is provided with a narrowed shaft extension 37 which is accommodated in a bore 35 of the head extension 34. The shaft 36 is secured to the piston 32 by means of the C-clip 38 at the terminal end of the shaft extension as shown in the drawing.

Mounted on the top of piston 32 in a base recess 44 is a coiled spring 33 surmounted by a slideable washer 42 on the shaft of the piston. Thus, first contact of the coil spring 43 in compression is made by the washer 42 in contact with the raised annular shoulder 11. The washer 42 is shown slightly displaced from the shoulder 11 in the drawing for the sake of clarity. The piston is restricted in its downward movement by contact of the rim 33 with the sealing rim 26, and is also restricted in its upper movement by contact of the upper edge of the piston 32 with the annular shoulder 7.

As shown in the drawing of FIG. 3, the piston is in the upper or withdrawn position in contact with the intermediate band 64 of the transmission system, and the band is being applied at this moment. It will be noted that when the piston 32 is in the position shown in FIG. 3, at the uppermost point of its stroke, the check valve 46 is resting on the bottom of the bore 17 of the valve chamber 16, as indicated. As before stated, the valve is shown slightly removed from the bottom of the chamber in this drawing as the other parts are shown slightly displaced for the sake of clarity. The check valve 46 shown in this drawing is the valve of the present invention and will be discussed now in more detail below.

First, attention is called to FIG. 5, wherein the presently used type of check valve in this type of servo cylinder and check valve chamber is illustrated.

Referring to FIG. 5, the check valve 48 used in the present state of the art has a wide base relatively well displaced from the sides of the valve chamber bore 17. Upwardly, on the shank of the body of the valve, there is located an annular shoulder 50, of approximately the same radius, also relatively displaced from the sides of the bore 17. However, this shoulder 50 is so disposed upwardly from the base 49 that when the valve is resting on the bottom of the valve chamber the shoulder 50 is disposed almost directly opposite the oil inlet 21, as indicated. Above the shoulder 50 the valve is provided with a wider body section carrying a spring 52 (which is relatively weak under compression) the top of which rests against the valve seat portion of the valve chamber. The seat is designated as 55.

Considering now FIGS. 3 and 5, it will be seen that the check valve 46 of the present invention can be compared to the check valve 48 in the present state of the art and the two floating check valves can be compared in a relative manner. If, for example, the inside diameter of the check valve chamber or bore 17 is 0.500 inches the outside diameter of the shoulder 50 is approximately 0.450 inches. The valve of the present invention 46 can be considered to be running in a bore having an inside diameter of 0.500 inches where the shoulder 45 of the check valve 46 has an outside diameter of 0.495 inches. The base 47 of our check valve is somewhat smaller and displaced from the sides of the bore as shown. The more pertinent details of our check valve can best be seen in FIGS. 4, 7, 8 and 9.

Referring now more particularly to FIGS. 4, 7, 8 and 9, more detail on the check valve of our invention will be shown. Our check valve is slightly longer in length than the valve 48 of the present art but, more importantly, is provided with an annular shoulder 45 of larger outside diameter and a closer tolerance in the valve bore deliberately disposed with the lower edge of the shoulder 45 displaced a distance above the entrance of the inlet bore 21 of the valve chamber. Essentially, our valve is so constructed that when the float-valve body rests on the bottom of the valve chamber 16 within the bore 17 the shoulder 45 will be slightly disposed above the oil inlet bore 21. This must be compared with the valve of the present art wherein the shoulder 50 is disposed almost opposite the inlet bore 21. A major advantage is obtained in our valve which will be discussed in the specification at a later point. Our valve 46 is provided with an extended axial bore 56 which reaches almost to the top of the valve body and the configurated conical top 54 as shown. The base 47 of our valve does not have as large an outside diameter as that of the shoulder 45. Our valve body is provided with disposed a distance below shoulder 45, at least a pair of inlet ports 58, and disposed immediately above the shoulder 45 at least a pair of outlet ports 57. These may be referred to, respectively, as the lower port and upper port.

Figure 8:
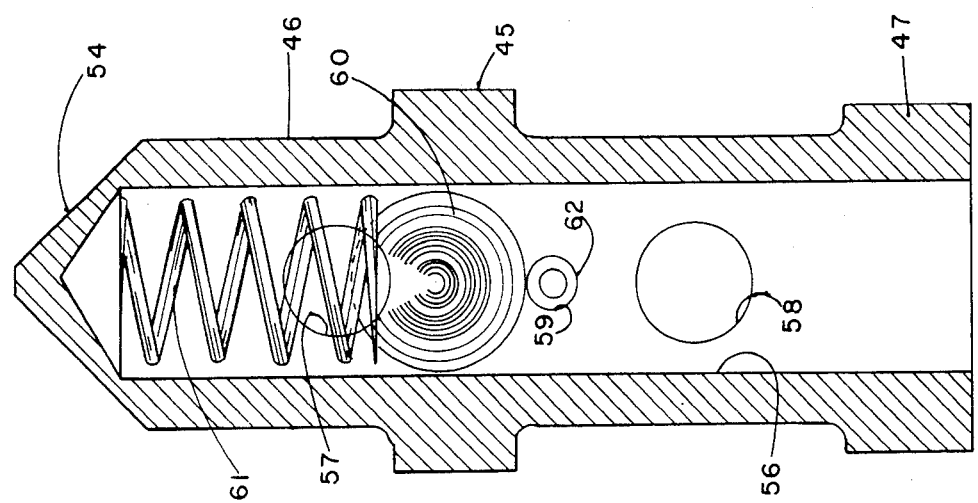
FIG. 8 is a section view enlarged of the check valve of the applicants' invention with the check ball seated to prevent flow through the valve body.

Disposed within the upper portion of the bore 56 of the valve is a check ball 60 resting against a light compression spring 61. When the valve is at rest on the bottom of the valve chamber bore 17, the check ball, as shown in FIG. 8, is resting, as urged downwardly, against a retaining pin 62 which is carried in a retaining pin bore 59. When the valve 46 is resting in its seat in the top of the valve chamber 16 closing the exhaust port 18 the check ball 60 is in the position shown in FIG. 9, with the check ball in the extreme upward position with the spring 61 compressed in light pressure.

Figure 6:
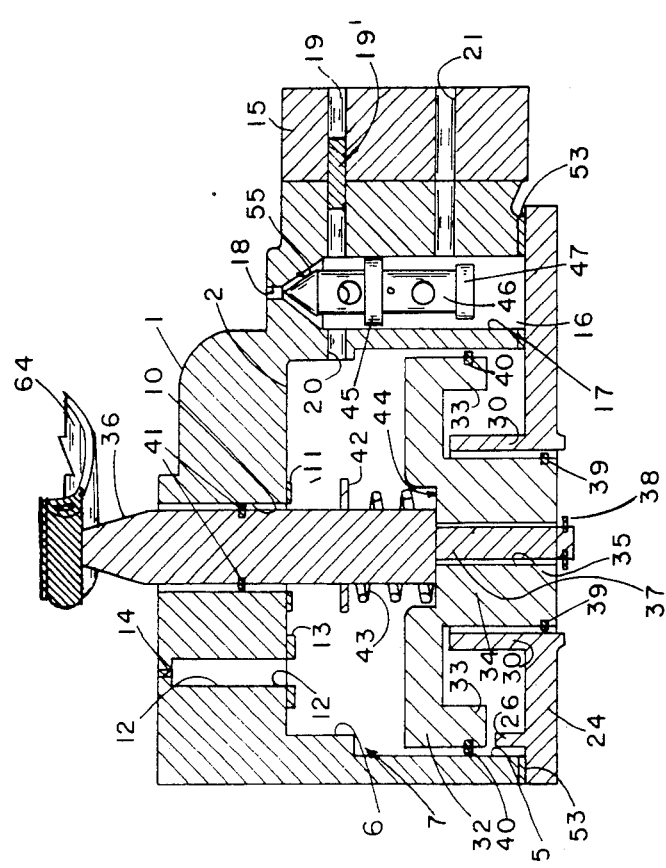
FIG. 6 is a modified section view of the cylinder and valve assembly of FIG. 1, taken along the lines 3—3 of FIG. 1, with the same section view of an in-place piston in the lowered, band releasing mode with the check valve of the applicants in the upper position in the chamber, almost seated.

In order to understand the operation of the invention it is now necessary to consider the operation of the intermediate servo cylinder 2 in relation to its function as shown in the positions in FIGS. 3 and 6 of the drawings. As we have previously represented in the introduction to this specification the purpose of the servo cylinder is to apply and release the intermediate band 64 which holds this type of automatic transmission gear.

It must be remembered that the intermediate servo cylinder is being at all times fed with oil coming from the torque converter of the transmission through a pump and a series of control valves actuated by a governor regulated to the speed of the automobile.

It must be noted in FIGS. 3 and 6 that the servo piston 32 has a larger oil pressure surface area on the upper side thereof than it does on the lower side. The piston in its upper position works against the compression spring 43, but it can be seen that there must be maintained a positive and continous pressure of oil on the upper side of the piston 32, which has a bleed orifice 14 and an exhaust port 18 in order to overcome the pressure on the underside of the servo piston. The underside of the piston is provided with the downward head extension 34 which fits in the sleeve 30 to restrict the oil surface pressure area on the lower side of the piston.

With the servo piston as shown in FIG. 3, having the cylinder head 24 firmly affixed in place and sealed by means of the common gasket 53 drive oil is being applied through the 1-2 shift valve and through the vertical oil passage 22 in the wall of the cylinder through the horizontal inlet passage 27 to the bottom side or lower side of the servo piston 32. In this condition the pressure of the oil coming from the 2-3 shift valve through the oil inlet 21 into the valve chamber 16 is not sufficient to lift the check valve and the exhaust port 18 is open such that, together with the bleed orifice 14, pressure on the top side of the piston 32 is less than the pressure on the bottom side of such piston and the piston is raised into the position shown in FIG. 3 with the shaft 36 against the intermediate band 64 tightening the same at the same time the direct clutch of the gear train is released to allow the automobile to be shifted into second gear.

When the speed of the automobile has thus been obtained or the throttle sufficiently opened, the 2-3 shift valve comes into operation and sends oil simultaneously to the direct clutch and the accumulator line through the check valve chamber 16 by means of the inlet bore 21 to move the piston 32 in the opposite release position, as shown in FIG. 6, to release the intermediate band.

As the governor opens the 2-3 shift valve train oil pressure begins to build up through the inlet bore 21 around the lower side of the check valve 46. This operation is so synchronized that the floating check valve 46 moves upwardly and seats in the exhaust port 18, closing the same, allowing the oil to flow through the inlet bore 20 to the upper (or release) side of the piston 32. With the check valve 46 thus seated the oil pressure on the upper side of the piston 32 moves this piston down into the position shown in FIG. 6 with the valve in place and withdraws the piston shaft 36 into the cylinder to away from and releasing the intermediate band 64 at the same time, in synchronized sequence, oil is sent to the direct clutch and, with the intermediate band released, the automobile shifts smoothly into third gear.

It is, therefore, quite critical that the check valve 46 of the present invention and the check valve 48 of the present art seat to occlude the exhaust port 18 in a positive manner and remain seated. Otherwise, if there is any unseating of the check valve 46 or 48 during this operation it is going to decrease the pressure on the upper side of the servo piston 32, cause the piston shaft 36 to project upwardly from the cylinder and begin to apply the intermediate band 64 when it should be released in order to allow the automobile to shift smoothly and quickly from second gear into third gear and not fall out of the third gear.

It is also apparent that any slow seating of the third accumulator check valve, with which we are dealing, causes a slow or hesitant shift, creating excessive wear on the intermediate band and the high clutches of the gear drive train.

In the use of the check valve 48, as illustrative of the valves presently in use of this type, valve 48 is lifted into position by the flow of oil through the inlet bore 21 in the valve bore 17 through a rather obstructed path down past the shoulder 50, to get under this shoulder and lift the valve 48 upwardly against the pressure of the spring 52 in order to seat it in the exhaust port 18. The shoulder of the valve 48 is so disposed that when the valve falls down into the base of the bore the shoulder is even with the input feed of oil through the bore 21 and not above this bore as it should be. This makes it very difficult for the flow of oil to pick up the valve and lift it into the seat, causing a delay in seating.

At low speeds with the present valve 48, in high gear the flow of fluid past the shoulder of the valve is not adequate to keep the valve seated, causing the valve to allow the exhaust port 18 to partially open and exhaust fluid pressure, which, in turn, allow the intermediate band to partially apply or drag and the high clutches to slip. Even with the valve chamber bore 17 extended in length, with the shorter valve body 48, although this would place the bore 20 below the valve shoulder 50 when valve 48 was seated, the fluid must still flow under the shoulder 50 of this valve and around the edges thereof until such time as the shoulder reaches a point above the bore 20. Thus, it can be seen that with the type of valve shown in 48, the spring allows the pressure to be built up prior to the seating of the valve but the valve seating is much slower than it should be because of the impeded path of the oil.

Figure 9:
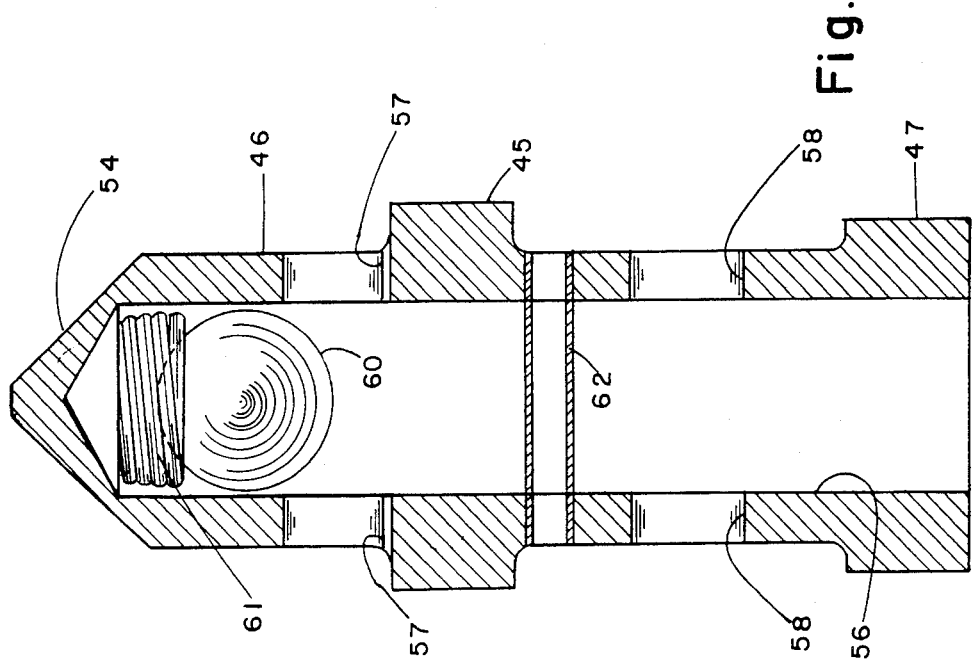
FIG. 9 is a section view enlarged of the check valve of applicants' invention, turned to show a section through the exit ports, with the check ball retracted to allow flow through the valve body and ports thereof.

In the valve of the present invention, as seen more clearly in FIGS. 3, 4, 6 and 7, showing the valve operation; and in FIGS. 8 and 9 showing the structure of the valve it can be seen that we have provided a valve which operates much more efficiently under the same conditions in this type of transmission system.

In a system using the type of servo cylinder which we have shown our valve body has the shoulder 45 located such that when the valve is resting on the bottom of the valve chamber the shoulder 45 is above the oil inlet bore 21. Also, the inside of the valve body is provided with a hollow bore 56 with inlet port 58 and outlet port 57.

The oil enters the valve chamber through the inlet bore 21 flows around beneath the shoulder 50 down and through the inlet port 58 into the inner bore of the valve body. The oil then flows upwardly through the bore 56 to exert pressure on the bottom of the check ball 60 overcoming the tension of the spring 61 and removing the ball in spring urged action against the top of the bore 56 to a position where the check ball 60 exposes the outlet port 57. Thus the oil flows against the shoulder 45 through the lower port 58 into the bore 56 upward against the check ball which urges the spring upwardly and gives a springing action to urge the body of the valve upwardly, while at the same time, as the ball approaches the point where it exposes the upper port 57 it allows the oil to flow out into the chamber and through the bore 20 to the upper side of the piston 32.

We have provided more surface area in the body of our floating check valve body against which the oil pressure may act. Since the bore 56 extends through the bottom end of the valve body oil can flow freely through the lower port 58 and through the bottom of the valve body into the valve, exerting pressure on the sides of the valve and against the check ball, giving more surface area for upward pressure. This is as opposed to the small amount of surface area for pressure on the shoulder 50 of the valve 48 used in present systems of this type.

It can readily be seen that the check valve of our invention is very positively moved upwardly and positively seated in the exhaust port 18. The extra surface area of the check ball 60 and the inside of the valve body against which it is working keeps this valve seated, against the urging of the spring and with the assist of the spring, until the oil pressure entering through the bore 21 is released in a downshift. It is obvious that in our invention the check ball allows the fluid to go through the valve rather than around it and gives a more positive lift as indicated. Here, when there is only very slight fluid pressure applied to the ball and spring the valve stays seated rather than falling back away from the seat and exhausting fluid pressure which would cause the intermediate band to drag and the high clutches to slip.

When the speed of the automobile slows down or the throttle is released, the oil coming from the torque converter through the 2-3 shift valve is restricted, releasing the direct clutch and the pressure of the oil going through the bore 21 and 20 to the upper side of the servo cylinder. Therefore, when this condition occurs the reverse type of operation takes place, the pressure is released on the upper side of the piston 32 and the pressure on the bottom side of the piston causes the same to be raised and apply the intermediate band.

Our invention has been directed to a means of preventing the unwanted release of pressure on the upper side of the piston 32, at the wrong time, and the resultant applying of the intermediate band to drag.

It will be readily apparent that the embodiment of our invention shown is well adapted to meet all of the objects and ends of this invention. Thus it will be seen that we have provided an accumulator check valve suitably adapted to meet the objects and features hereinbefore set forth. From the foregoing, it will also be seen that the invention is well adapted to the use mentioned in this type of transmission system employing a servo cylinder with an exhaust valve to attain all of the ends and objects thereof, together with other advantages which are obvious and which are inherent to the structure of the invention.

It will be understood that certain features of any subcombination of the invention are of utility and may be employed without reference to other features and subcombinations. This is contemplated by and is within the scope of the claims. As many possible embodiments of the invention may be made without departing from the scope thereof, it is to be understood that all matters set forth or shown in the drawings are to be interpreted as illustrative and not in a limited sense.

Having thus described our invention, what is claimed is:

1. In a hydramatic automatic transmission system for motor vehicles of the type having a gear shift actuated by fluid operated clutches in conjunction with an intermediate brake band applied and released as activated by the thrust thereon and withdrawal therefrom, respectively, of the shaft of a servo piston of a hydraulically operated intermediate servo cylinder, said servo cylinder being juxtaposed and serviced selectively with drive oil through flow controls to the lower apply side of said piston, and through controls to the upper release side of said piston by regulation of oil flow to said side of the piston through a vertical cylindrical accumulator check valve chamber provided with a lower feed oil inlet port to said chamber and a upper outlet port from said chamber to the release side of said piston, an exhaust port in the upper end of said chamber adjacent to said upper outlet port, and a reciprocally floating cylindrical type check valve in said chamber responsive to inlet oil flow to seat and seal the exhaust port of said chamber to provide predominant oil pressure on the release side of said servo piston, the improvement in said floating check valve which comprises:

a check valve positioned in said valve chamber having a lengthwise body configured to conform to the shape of said chamber and reciprocate upwardly and downwardly therein responsive to changes in feed oil pressure to contact the upper and lower ends of said chamber;

the upper end of said valve body being correspondingly shaped to seat on the abutting surfaces of said exhaust port in occlusive contact with said port when the valve is in its uppermost position;

the lower end of said valve body being provided with a laterally projecting base of size such as to be movably disposed in sufficient displacement from the sides of the valve chamber to allow free fluid flow therebetween as such valve reciprocates and rests in its lowermost position on the bottom of said chamber;

the intermediate section of said valve body having a laterally projecting shoulder sized in movable displacement from the sides of the valve chamber located disposed upwardly from the base of said valve a distance therealong such that when the base rests upon the bottom of the valve chamber the lower edge of said shoulder is above the lower feed oil inlet port of said chamber receiving unrestricted oil flow pressure from said port;

said valve body having a lengthwise bore of relatively large inside diameter extending through the base of said body to a point proximate to the upper seating end of said body to receive fluid oil flow therethrough from said valve chamber;

said valve body having a lower communicating passage for oil flow between said bore and valve chamber disposed between the projecting base of the valve body and the lower side of said laterally projecting shoulder of the valve body;

said valve body further having an upper communicating passage for oil flow between said bore and valve chamber disposed above the projecting shoulder of said body;

closure means for said upper communicating oil flow passage with biasing means urging the same in a normally closed condition when said valve is not in the seated mode;

said closure and biasing means responsive to modulated increases in fluid pressure through the lower end of said bore, and applied to the sides of said valve, to first urge said valve upwardly into the seated position and then open said upper flow passage to allow the outward flow of fluid under pressure to the outlet port of said valve chamber.

2. A check valve as in claim 1, wherein the laterally projecting base thereof comprises:

an annular upwardly extending shoulder of outside diameter sufficiently less than the inside diameter of the valve chamber to allow free flow of oil between said shoulder and the wall of said chamber during reciprocation of said valve.

3. A check valve as in claim 1 wherein the laterally projecting shoulder of the intermediate section of said valve comprises:

an axially extended annular projection of the outer wall of the cylindrical body of said valve to form a shoulder provided with an upper pressure receptive surface and a lower pressure receptive surface;

the outside diameter of said shoulder sufficiently closely approximating the inside diameter of the valve chamber to allow said shoulder to be freely movable in relation thereto but to relatively restrict the free flow of oil between said shoulder and the wall of said chamber during reciprocation of said valve.

4. A check valve as in claim 1, wherein said lower communicating passage and said upper communicating passage for oil flow between said bore and valve chamber comprise:

a plurality of lower oil ports and a plurality of upper oil ports, respectively, extending through from the outer wall of said valve to the axial bore of said valve body.

5. A check valve as in claim 1, wherein said closure and biasing means for the upper communicating oil flow passage comprise:

a check ball located in said valve bore sized to fit said bore freely reciprocal therein but substantially restricting the flow of oil between said ball surface and the inside of said bore;

said check ball disposed normally, with the check valve under reduced pressure on the bottom of its chamber, preventing the bore oil flow from the bottom of said bore to the top of said bore and upper outlet passage, as biased downwardly in the bore by a light compression spring urging against the ball and top the bore, said ball positioned with the restricting contact area thereof below the lower edge of said outlet passage and the ball restrained from further downward movement by a barrier projection in said bore;

but said check ball closure and spring yieldably responsive to increased oil flow pressure from the bottom of said bore to lift the ball in the bore, simultaneously opening the flow path to the upper outlet passage and urging said spring with oil pressure to seat the check valve in the exhaust port of the check valve chamber.

6. An accumulator check valve for the valve chamber servicing feed oil to the upper release side of the intermediate servo cylinder of an automatic transmission for motor vehicles, wherein said valve chamber comprises a vertical cylindrical body provided with an exhaust port centrally disposed in a seat in its upper end, an upper oil outlet port from said chamber to the servo cylinder disposed displaced from the upper end of said chamber and a lower feed oil inlet port disposed displaced from the bottom of said chamber, said check valve consisting of:

an extended lengthwise valve body received by said chamber and configured to conform to the shape of the chamber and sized to reciprocate upwardly and downwardly therein responsive to changes in feed oil pressure to rest on the bottom of the chamber at lowered pressure and in contact with the upper exhaust port of the chamber at elevated pressures, the upper end of said valve body being correspondingly shaped to the seat of the exhaust port and occluding said port when the valve is in its uppermost position;

the lower end of said valve body being provided with a laterally projecting base of size such as to be movably disposed in sufficient displacement from the sides of the valve chamber to allow free fluid flow therebetween as such valve reciprocates and rests in its lowermost position on the bottom of said chamber;

said valve having a lateral projection intermediate its ends providing a shoulder sized in movable displacement from the sides of the valve chamber and located disposed upwardly from the base of said valve a distance therefrom such that when the base rests upon the bottom of the valve chamber the lower edge of the shoulder is above the lower feed oil inlet port of said chamber receiving unrestricted oil flow pressure from said port;

said valve body being provided with a lengthwise bore of relatively large inside diameter extending through the base of said body to a point proximate to the upper seating end of said valve to receive fluid oil flow therethrough from said chamber;

said valve body having passages for oil flow between said bore and valve chamber consisting of a lower passage disposed between the projecting base of the valve body and the lower side of the laterally projecting shoulder of the valve body and an upper passage disposed above said projecting shoulder between the same and the seating end of the valve;

closure means for said upper oil passage with biasing means urging the same in a normally closed condition when said valve is not in the seated mode;

said closure and biasing means responsive to modulated increases in fluid oil pressure through the lower end of said bore, and applied to the sides of said valve, to first urge said valve upwardly into a seated position in the exhaust port and then open said upper oil flow passage to allow the outward flow of fluid pressure to the outlet port of said valve chamber.

7. A check valve as in claim 6, wherein the laterally projecting base thereof comprises:
an annular slightly upwardly extending shoulder of outside diameter sufficiently less than the inside diameter of the valve chamber to allow free flow of oil between said shoulder and the wall of said chamber during reciprocation of said valve.

8. A check valve as in claim 6 wherein the laterally projecting shoulder of the intermediate section of said valve comprises:
an axially extended annular projection of the outer wall of the cylindrical body of said valve to form a shoulder corresponding in axial length to the axial length of said base provided with an upper pressure receptive surface and a lower pressure receptive surface;
the outside diameter of said shoulder sufficiently closely approximating the inside diameter of the valve chamber to allow said shoulder to be freely movable in relation thereto but to relatively restrict the free flow of oil between said shoulder and the wall of said chamber responsive to oil pressure on its lower pressure receptive surface during reciprocation of said valve.

9. A check valve as in claim 6 wherein said lower oil passage and said upper oil passage communicating between said bore and valve chamber comprise:
a plurality of lower oil ports and a plurality of upper oil ports, respectively, extending through from the outerwall of said valve to the axial bore of said valve body.

10. A check valve as in claim 6, wherein said clause and biasing means for the upper communicating oil flow passage comprise:
a check ball located in said valve bore sized to fit said bore freely reciprocal therein but substantially restricting the flow of oil between said ball surface and the inside of said bore;
said check ball disposed normally, with the check valve under reduced pressure on the bottom of its chamber, preventing the bore oil flow from the bottom of said bore to the top of said bore and upper outlet passage, as biased downwardly in the bore by a light compression spring urging against the ball and top the bore, said ball positioned with the restricting contact area thereof below the lower edge of said outlet passage and the ball restrained from further downward movement by a barrier projection in said bore;
but said check ball closure and spring yieldably responsive to increased oil flow pressure from the bottom of said bore to lift the ball in the bore, simultaneously opening the flow path to the upper outlet passage and urging said spring with oil pressure to seat the check valve in the exhaust port of the check valve chamber.

* * * * *